May 12, 1964    A. HASBROUCK ETAL    3,132,481
INJECTOR HEAD FOR LIQUID ROCKET
Filed June 23, 1959

INVENTORS
AUGUSTUS HASBROUCK
MARCUS C. BENEDICT

BY Charles A. Warman
ATTORNEY

United States Patent Office 3,132,481
Patented May 12, 1964

3,132,481
INJECTOR HEAD FOR LIQUID ROCKET
Augustus Hasbrouck, Middletown, and Marcus C. Benedict, Glastonbury, Conn., assignors to United Aircraft Corporation, East Hartford, Conn., a corporation of Delaware
Filed June 23, 1959, Ser. No. 822,376
7 Claims. (Cl. 60—39.46)

This invention relates to an injector for use in fluid propellant rockets.

In order to deliver sufficient quantities of propellants to the combustion chamber, it has been common practice to provide a large number of inlet nozzles in an injection area of the combustion chamber. This injection area may be made up of a large number of small injector elements arranged to fit together to cover substantially the entire injector area. This arrangement is described and claimed in the co-pending application of Ledwith and Benedict, Serial No. 822,377 filed June 23, 1959, now Patent No. 3,071,925 issued January 8, 1963. One feature of the present invention is an arrangement of the injector elements for the purpose of improving propellant delivery and also for facilitating assembly.

One feature of the invention is an arrangement for minimizing parts essential for the injector element assemblies and also to control the propellant flow so that there is no need for a seal between adjacent injector elements.

One feature of the invention is a baffle so located within the injector head as to cause a flow of propellant over the inner surface of the injector elements before the propellant is discharged into the combustion chamber.

Other features and advantages will be apparent from the specification and claims, and from the accompanying drawing which illustrates an embodiment of the invention.

Figure 2:
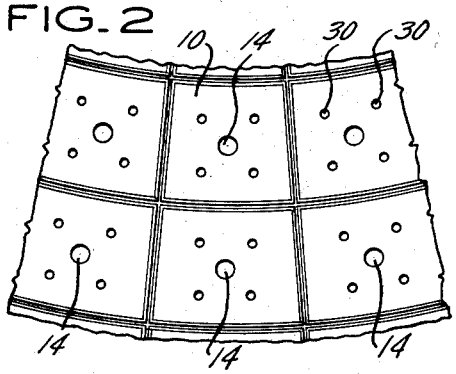
FIG. 2 is a fragmentary plan view showing the face of the injector head.

The invention is shown in connection with a rocket combustion chamber 2 having a substantially cylindrical side wall 4 and a head 6 forming a closed end on the chamber. This head is constructed to form an injector head through which the propellants are delivered into the combustion chamber. The injector head includes a plate 8, the periphery of which is suitably attached to the side wall 4 and which forms a basic structural element for the injector head. This plate supports a plurality of similarly shaped injector elements 10. These elements, in the arrangement shown in FIG. 2, are sector shaped and are arranged in concentric rings making up the inner wall of the injector head. The injector elements 10 are designed so that the discharge ends which make up the inner wall of the injector head are spaced apart, FIG. 3.

Figure 1:
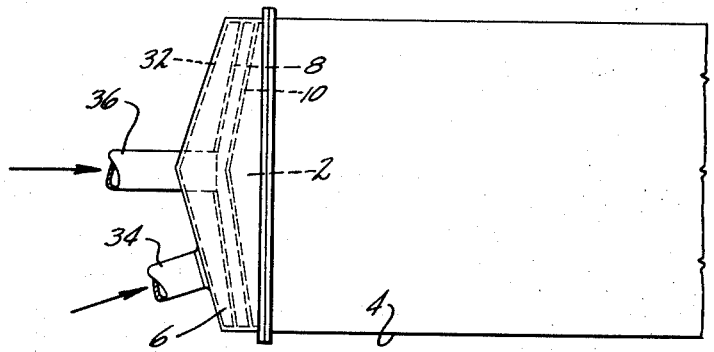
FIG. 1 is a fragmentary elevation of an injector head embodying the invention.
Figures 7, 8:
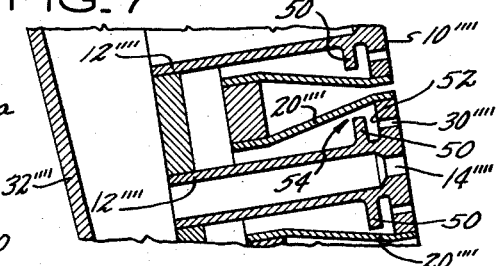
FIG. 7 is a view similar to FIG. 4 showing another modification.
FIG. 8 is a plan view similar to FIG. 2 showing a modification.

In the arrangement shown in FIGS. 1 and 2, the elements 10 are sector shaped whereas in FIG. 8 the elements 10a are hexagonal in shape. In either event, the elements interfit and the remainder of the structure is not substantially altered.

Figure 3:
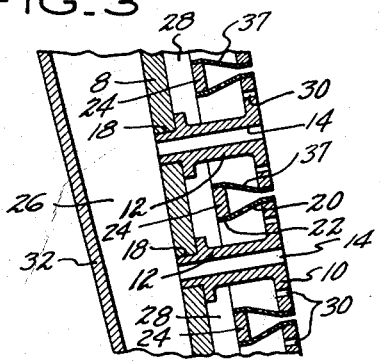
FIG. 3 is an enlarged sectional view of a portion of the injector head.

Each injector element 10 has a propellant discharge plate provided with a centrally located opening, or passageway, 14 which is supplied with fluid through a hollow post 12 supported at its inner end in an opening 18 in the plate 8 and communicating with the central opening in the plate at its opposite end. The post 12 is shown in FIGS. 2 and 3 as integral with the element 10.

Surrounding the post is a sleeve 20 connected at its outer end to the periphery of the propellant discharge plate of element 10. This sleeve extends in spaced surrounding relation to the post 12 and is received within an opening 22 in a plate 24 positioned between the plate 8 and the elements 10. Sleeve 20 thus defines the outer periphery of each injector element 10 and, as shown in the enlarged sectional FIG. 3, for example, there is a well-defined space between the sleeves 20 of adjacent elements 10.

With this arrangement, on of the propellants, for example, the oxidizer, in a chamber 26 on the upstream side of the plate 8 flows through the hollow posts and is discharged into the combustion chamber. The other propellant, which may be the fuel, flows from the chamber 28 defined by the plates 8 and 24 through the sleeves 20 in surrounding relation to the post and is delivered through the ring of propellant openings, or passageways, 30 surrounding the central opening. The chamber 26 is formed between plate 8 and an outer casing or cap 32. The propellants are delivered through ducts 34 and 36 to the chambers 26 and 28, respectively.

In the assembly of these injector elements and associated parts, it will be apparent that each of these elements with its associated post and surrounding sleeve may be assembled as a unit and then inserted into the openings in the plate 24 so that the sleeves 20 may be brazed to this plate. Subsequently, the plate 8 is positioned over the posts and these parts brazed together. If desired, each sleeve 20 may have a vent passage 37 therein in order that the volume between the plate 24 and the plane of the heads 10 and surrounding the sleeves 20 may be filled with fuel to prevent combustion in this space.

Figures 4, 5, 6:
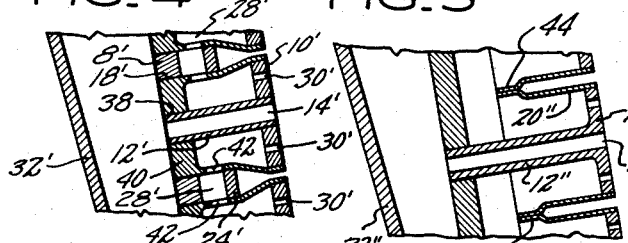
FIG. 4 is a view similar to FIG. 3 showing a modification.
FIG. 5 is a view similar to FIG. 4 showing another modification.
FIG. 6 is a view similar to FIG. 4 showing another modification.

In the modification of FIG. 4, the central post 12' has its upstream end positioned in a central opening 38 in a cup-shaped element 40, the latter fitting within an opening 18' in the plate 8'. The walls of the cup extend into surrounding relation to the associated element 10' with the rim of the cup brazed or otherwise attached to the element. The upper portion of the cup corresponds to the sleeve 20, FIG. 3, and a plate 24' receives the several cups in a manner similar to the positioning of the sleeves 20. The cups have lateral openings 42 therein for the admission on one of the propellants from the chamber 28' to the interior of the cup to be discharged into the ring of openings 30' surrounding the central opening 14'. A space is provided between the rims of cups 40 of adjacent injector elements 10'.

In the arrangement shown in FIG. 5, the central post 12'' is made integral with the associated element 10'' and the edge of the element 10'' carries a sleeve 20''. The ends of adjacent sleeves 20'' remote from the elements 10'' are brazed together as at 44 thereby eliminating the need for the plate 24 or 24', as in FIGS. 3 and 4. Sleeves 20'' are offset adjacent their downstream ends to provide a space between adjacent elements 10''.

For additional simplification, as shown in FIG. 6, the hollow post 12''', the element 10''' and the sleeve 20''' may be made integral. In this arrangement, the sleeves 20''' may have their free edges brazed as at 46 to the free edges of adjacent sleeves to form a tight connection between adjacent elements in a manner similar to that of FIG. 5. Sleeves 20''' are offset, as in FIG. 5, to provide a space between adjacent elements 10'''.

In addition, to improve the flow of the propellant through post 12''' and into the combustion chamber through nozzle or opening 14''', the post may have mounted therein a helical swirler 48 that will impart a swirl to the propellant before it reaches the opening 14'''.

As above stated, it may be desirable to cool as effectively as possible the injector elements. To accomplish this a baffle 50, FIG. 7, may be positioned on the post 12'''', at a point spaced a small distance from the under surface 52 of the element 10''''. This baffle is preferably similar in shape to the element and somewhat smaller such that the periphery 54 is spaced from the surrounding sleeve 20''''. With this arrangement, propellant, as a coolant, flows around the periphery of the baffle and thence over the surface 52 to enter the discharge openings 30''''. By placing the openings 30'''' close to the post the cooling effect may be increased. It will be understood that this baffle arrangement may be added to any of the arrangements shown.

It is to be understood that the invention is not limited to the specific embodiment herein illustrated and described, but may be used in other ways without departure from its spirit as defined by the following claims.

We claim:

1. An injector for a rocket chamber, including a plurality of similarly shaped injector elements each having a flat discharge plate in said chamber provided with a central discharge opening for one propellant and surrounding discharge openings for another propellant, said elements being spaced apart, a supporting plate for said elements and a plurality of hollow posts, one post extending from the central discharge opening of each element to said supporting plate with said one propellant supplied through said hollow post to said central discharge opening, and sleeves on the peripheries of the elements and projecting therefrom toward the supporting plate through which the other propellant is directed to said surrounding discharge openings, the free edges of the sleeves on adjacent elements being secured together.

2. An injector as in claim 1 in which the injector elements are all substantially similar in dimension and interfit to form a substantially continuous surface.

3. An injector as in claim 1 in which the elements are all substantially hexagonal in shape and interfit to form a substantially continuous surface.

4. An injector as in claim 1 in which the elements are all sector shaped and are arranged in concentric rings.

5. An injector head for a rocket combustion chamber including an outer casing, a first plate secured to said casing forming therewith one propellant chamber, a plurality of spaced similarly shaped injector elements supported by said plate, each having a propellant discharge plate spaced from said first plate, one surface of which is exposed in said combustion chamber, the space between said first plate and said discharge plates forming a second propellant chamber, each injector element having a central discharge passageway through its discharge plate and a plurality of surrounding discharge passageways, and means for supporting said injector elements including a hollow post secured at one end to the discharge plate of each element surrounding said central passageway and extended from the central discharge passageway of said element through said first plate into said first propellant chamber, a sleeve connected at one end to the outer margin of the discharge plate of each injector element and projecting into said second propellant chamber, and means for connecting the projecting ends of the sleeves of adjacent elements in said second propellant chamber.

6. An injector head for a rocket combustion chamber including an outer casing, a first plate secured to said casing forming therewith one propellant chamber, a second plate spaced from said first plate forming therewith a second propellant chamber, a plurality of spaced similarly shaped injector elements supported by said plates, each having a propellant discharge plate spaced from said second plate, one surface of which is exposed in the combustion chamber, each discharge plate having a central passageway therethrough into the combustion chamber and a plurality of surrounding passageways, and means for supporting each of said injector elements including a hollow post surrounding said central passageway at one end and extended at its other end through said first plate into said first propellant chamber and a sleeve surrounding the outer margin of each injector element at one end and extended at its other end through said second plate into said second propellant chamber.

7. An injector for a rocket chamber, including a plurality of similarly shaped injector elements each having a flat discharge plate provided with a discharge opening for one propellant and at least one other discharge opening for another propellant, said elements being spaced apart, a supporting plate spaced from said elements and a plurality of hollow posts extending from said plate to said elements, each post supporting one of said elements and being connected to said first discharge opening for delivering a supply of said one propellant through said opening to the chamber, and a surrounding sleeve extending upstream from the periphery of each of said elements through which said other propellant is directed to said other discharge opening, said sleeves on adjacent elements having their upstream edges connected together to prevent leakage of propellant through the spaces between adjacent elements.

References Cited in the file of this patent

UNITED STATES PATENTS

| | | |
|---|---|---|
| 2,396,567 | Goddard | Mar. 12, 1946 |
| 2,405,785 | Goddard | Aug. 13, 1946 |
| 2,510,571 | Goddard | June 6, 1950 |
| 2,569,887 | Goddard | Oct. 2, 1951 |
| 2,733,570 | Macpherson | Feb. 7, 1956 |
| 2,928,236 | Kircher et al. | Mar. 15, 1960 |
| 2,929,208 | Schultz | Mar. 22, 1960 |
| 2,940,259 | Mantler | June 14, 1960 |